(12) United States Patent
Andreou et al.

(10) Patent No.: US 11,943,183 B2
(45) Date of Patent: Mar. 26, 2024

(54) APPLICATION-INDEPENDENT MESSAGING SYSTEM

(71) Applicant: Snap Inc., Santa Monica, CA (US)

(72) Inventors: Jacob Andreou, Santa Monica, CA (US); Yang Dai, Los Angeles, CA (US); Sebastian Gil, Venice, CA (US); Tengfei Li, Los Angeles, CA (US); Yansong Liu, Marina del Rey, CA (US); Andy Ly, Friendswood, TX (US); Chamal Samaranayake, Venice, CA (US); Jianwei Tu, Irvine, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/204,203

(22) Filed: May 31, 2023

(65) Prior Publication Data

US 2023/0328014 A1  Oct. 12, 2023

Related U.S. Application Data

(63) Continuation of application No. 16/942,061, filed on Jul. 29, 2020, which is a continuation of application No. 15/859,237, filed on Dec. 29, 2017, now Pat. No. 10,791,077.

(60) Provisional application No. 62/542,629, filed on Aug. 8, 2017.

(51) Int. Cl.
*H04L 51/066* (2022.01)
*H04L 51/18* (2022.01)
*H04L 51/56* (2022.01)
*H04L 51/58* (2022.01)
*H04L 51/08* (2022.01)

(52) U.S. Cl.
CPC ............ *H04L 51/066* (2013.01); *H04L 51/18* (2013.01); *H04L 51/56* (2022.05); *H04L 51/58* (2022.05); *H04L 51/08* (2013.01)

(58) Field of Classification Search
None
See application file for complete search history.

(56) References Cited

U.S. PATENT DOCUMENTS

| 5,754,939 A | 5/1998 | Herz et al. |
|---|---|---|
| 6,038,295 A | 3/2000 | Mattes |
| 6,158,044 A | 12/2000 | Tibbetts |

(Continued)

FOREIGN PATENT DOCUMENTS

| CA | 2887596 | 7/2015 |
|---|---|---|
| CN | 1653829 A | 8/2005 |

(Continued)

OTHER PUBLICATIONS

U.S. Appl. No. 15/859,237 U.S. Pat. No. 10,791,077, filed Dec. 29, 2017, Application-Independent Messaging System.

(Continued)

*Primary Examiner* — Angela Nguyen
(74) *Attorney, Agent, or Firm* — Schwegman Lundberg & Woessner, P.A.

(57) ABSTRACT

Among other things, embodiments of the present disclosure improve the functionality of electronic messaging software and systems by allowing senders to transmit messages and content using a messaging system, and recipients to access such messages and content, even if the recipients do not have access to the messaging system.

20 Claims, 14 Drawing Sheets

(56) References Cited

U.S. PATENT DOCUMENTS

| | | | |
|---|---|---|---|
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,681,393 B1 | 1/2004 | Bauminger et al. | |
| 6,701,347 B1 | 3/2004 | Ogilvie | |
| 6,711,608 B1 | 3/2004 | Ogilvie | |
| 6,732,103 B1 | 5/2004 | Strick et al. | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,397,806 B2 | 7/2008 | Burger | |
| 7,411,493 B2 | 8/2008 | Smith | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,818,415 B2 | 10/2010 | Jhanji | |
| 7,912,896 B2 | 3/2011 | Wolovitz et al. | |
| 8,065,171 B2 | 11/2011 | Nguyen et al. | |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,570,907 B2 | 10/2013 | Garcia, Jr. et al. | |
| 8,643,677 B2 | 2/2014 | Suzuki | |
| 8,718,333 B2 | 5/2014 | Wolf et al. | |
| 8,724,622 B2 | 5/2014 | Rojas | |
| 8,745,132 B2 | 6/2014 | Obradovich | |
| RE45,040 E | 7/2014 | Fish et al. | |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,933,967 B2 | 1/2015 | Huston et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,118,723 B1 | 8/2015 | Su et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,245,025 B2 | 1/2016 | Chen | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,356,904 B1 | 5/2016 | Ho | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,495,086 B2 | 11/2016 | May et al. | |
| 9,503,873 B1 | 11/2016 | Yadav | |
| 9,532,171 B2 | 12/2016 | Allen et al. | |
| 9,537,811 B2 | 1/2017 | Allen et al. | |
| 9,544,257 B2 | 1/2017 | Ogundokun et al. | |
| 9,560,006 B2 | 1/2017 | Prado et al. | |
| 9,628,950 B1 | 4/2017 | Noeth et al. | |
| 9,639,561 B2 | 5/2017 | Roberts et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,817,995 B2 | 11/2017 | Papakipos et al. | |
| 9,825,898 B2 | 11/2017 | Sehn | |
| 9,854,219 B2 | 12/2017 | Sehn | |
| 9,918,193 B1 | 3/2018 | Nguyen et al. | |
| 9,961,520 B2 | 5/2018 | Brooks et al. | |
| 9,977,510 B1 | 5/2018 | Moffett et al. | |
| 9,992,146 B2 | 6/2018 | Fabre et al. | |
| 10,037,498 B2 | 7/2018 | Correll et al. | |
| 10,049,330 B2 | 8/2018 | Alag et al. | |
| 10,395,257 B2 | 8/2019 | Patterson et al. | |
| 10,471,341 B1 | 11/2019 | Xu | |
| 10,559,107 B1 | 2/2020 | Charlton et al. | |
| 10,686,748 B1 | 6/2020 | Dorsey et al. | |
| 10,728,701 B1 | 7/2020 | Chandrasekaran et al. | |
| 10,791,077 B2 | 9/2020 | Andreou et al. | |
| 11,134,036 B2 | 9/2021 | Taitz et al. | |
| 11,411,900 B2 | 8/2022 | Boyd et al. | |
| 11,418,465 B2 | 8/2022 | Taitz et al. | |
| 11,727,430 B2 | 8/2023 | Mitchell | |
| 2002/0047868 A1 | 4/2002 | Miyazawa | |
| 2002/0070954 A1 | 6/2002 | Lang | |
| 2002/0144154 A1 | 10/2002 | Tomkow | |
| 2002/0156848 A1 | 10/2002 | Grouse | |
| 2003/0012150 A1* | 1/2003 | Chapuran | H04Q 3/0037 370/271 |
| 2003/0052925 A1 | 3/2003 | Daimon et al. | |
| 2003/0126215 A1 | 7/2003 | Udell | |
| 2003/0217106 A1 | 11/2003 | Adar et al. | |
| 2004/0162881 A1 | 8/2004 | Digate et al. | |
| 2004/0203959 A1 | 10/2004 | Coombes | |
| 2005/0097176 A1 | 5/2005 | Schatz et al. | |
| 2005/0198128 A1 | 9/2005 | Anderson | |
| 2005/0223066 A1 | 10/2005 | Buchheit et al. | |
| 2005/0267975 A1 | 12/2005 | Qureshi et al. | |
| 2006/0242239 A1 | 10/2006 | Morishima et al. | |
| 2006/0270419 A1 | 11/2006 | Crowley et al. | |
| 2007/0038715 A1 | 2/2007 | Collins et al. | |
| 2007/0064899 A1 | 3/2007 | Boss et al. | |
| 2007/0073823 A1 | 3/2007 | Cohen et al. | |
| 2007/0198316 A1 | 8/2007 | Boland et al. | |
| 2007/0214216 A1 | 9/2007 | Carrer et al. | |
| 2007/0233801 A1 | 10/2007 | Eren et al. | |
| 2007/0242131 A1 | 10/2007 | Sanz-pastor et al. | |
| 2007/0250366 A1 | 10/2007 | Nurmi | |
| 2008/0055269 A1 | 3/2008 | Lemay et al. | |
| 2008/0076453 A1 | 3/2008 | Cai et al. | |
| 2008/0098079 A1 | 4/2008 | Sanghavi | |
| 2008/0120409 A1 | 5/2008 | Sun et al. | |
| 2008/0162615 A1 | 7/2008 | Hurmola et al. | |
| 2008/0207176 A1 | 8/2008 | Brackbill et al. | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0132453 A1 | 5/2009 | Hangartner et al. | |
| 2009/0132665 A1 | 5/2009 | Thomsen et al. | |
| 2009/0199230 A1 | 8/2009 | Kumar et al. | |
| 2009/0228322 A1 | 9/2009 | Van Os et al. | |
| 2009/0290690 A1* | 11/2009 | Fan | H04L 65/611 379/88.13 |

(56) References Cited

U.S. PATENT DOCUMENTS

| | | |
|---|---|---|
| 2010/0069104 A1 | 3/2010 | Neil et al. |
| 2010/0082427 A1 | 4/2010 | Burgener et al. |
| 2010/0082513 A1 | 4/2010 | Liu |
| 2010/0131598 A1 | 5/2010 | Ruelas-arana |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2010/0325220 A1* | 12/2010 | Skinner .......... H04N 21/234309 709/224 |
| 2011/0035678 A1 | 2/2011 | Hamrick et al. |
| 2011/0066363 A1 | 3/2011 | Kimishima |
| 2011/0099507 A1 | 4/2011 | Nesladek et al. |
| 2011/0126253 A1 | 5/2011 | Roberts et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0244894 A1 | 10/2011 | Mahalingam |
| 2011/0286586 A1 | 11/2011 | Saylor et al. |
| 2011/0312307 A1 | 12/2011 | Gross et al. |
| 2011/0320373 A1 | 12/2011 | Lee et al. |
| 2012/0028659 A1 | 2/2012 | Whitney et al. |
| 2012/0102123 A1 | 4/2012 | Tysk |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0246679 A1 | 9/2012 | Chen |
| 2012/0254325 A1 | 10/2012 | Majeti et al. |
| 2012/0278692 A1 | 11/2012 | Shi |
| 2012/0290666 A1 | 11/2012 | Fabre et al. |
| 2012/0304080 A1 | 11/2012 | Wormald et al. |
| 2012/0331568 A1 | 12/2012 | Weinstein et al. |
| 2013/0035995 A1 | 2/2013 | Patterson et al. |
| 2013/0066963 A1 | 3/2013 | Odio et al. |
| 2013/0071093 A1 | 3/2013 | Hanks et al. |
| 2013/0088494 A1 | 4/2013 | Ortiz |
| 2013/0144674 A1 | 6/2013 | Kim et al. |
| 2013/0166385 A1 | 6/2013 | Russell |
| 2013/0194301 A1 | 8/2013 | Robbins et al. |
| 2013/0198013 A1 | 8/2013 | Shehan et al. |
| 2013/0212494 A1 | 8/2013 | Heiferman et al. |
| 2013/0290443 A1 | 10/2013 | Collins et al. |
| 2013/0329060 A1 | 12/2013 | Yim |
| 2013/0332856 A1 | 12/2013 | Sanders et al. |
| 2014/0032682 A1 | 1/2014 | Prado et al. |
| 2014/0122787 A1 | 5/2014 | Shalvi et al. |
| 2014/0143434 A1 | 5/2014 | Sanche |
| 2014/0172856 A1 | 6/2014 | Imbruce et al. |
| 2014/0201527 A1 | 7/2014 | Krivorot |
| 2014/0280566 A1 | 9/2014 | Chen et al. |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0379798 A1 | 12/2014 | Bunner et al. |
| 2015/0066614 A1 | 3/2015 | Gilmartin et al. |
| 2015/0170045 A1 | 6/2015 | Kirkham et al. |
| 2015/0180980 A1 | 6/2015 | Welinder et al. |
| 2015/0199082 A1 | 7/2015 | Scholler et al. |
| 2015/0222580 A1 | 8/2015 | Grue |
| 2015/0227602 A1 | 8/2015 | Ramu et al. |
| 2015/0269531 A1 | 9/2015 | Menayas et al. |
| 2015/0271126 A1 | 9/2015 | Menayas et al. |
| 2015/0271638 A1 | 9/2015 | Menayas et al. |
| 2015/0324826 A1 | 11/2015 | Mizushima |
| 2016/0014059 A1 | 1/2016 | Rathod |
| 2016/0034827 A1 | 2/2016 | Morris |
| 2016/0044087 A1 | 2/2016 | Velummylum et al. |
| 2016/0049008 A1 | 2/2016 | Haddick et al. |
| 2016/0057156 A1 | 2/2016 | Lin et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0094961 A1 | 3/2016 | Agrawal et al. |
| 2016/0099901 A1 | 4/2016 | Allen et al. |
| 2016/0148158 A1 | 5/2016 | Marth et al. |
| 2016/0180887 A1 | 6/2016 | Sehn |
| 2016/0191653 A1 | 6/2016 | Aluotto |
| 2016/0196239 A1 | 7/2016 | Liu et al. |
| 2016/0253833 A1 | 9/2016 | Lew |
| 2016/0261527 A1 | 9/2016 | Huang |
| 2016/0269675 A1 | 9/2016 | Tsujimoto |
| 2016/0277419 A1 | 9/2016 | Allen et al. |
| 2016/0302037 A1 | 10/2016 | Jack et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0024091 A1 | 1/2017 | Hosier, Jr. |
| 2017/0104712 A1 | 4/2017 | Cho et al. |
| 2017/0118034 A1 | 4/2017 | Soli |
| 2017/0124606 A1 | 5/2017 | Belle |
| 2017/0149699 A1 | 5/2017 | Hinson, Jr. |
| 2017/0161382 A1 | 6/2017 | Ouimet et al. |
| 2017/0161599 A1 | 6/2017 | Li et al. |
| 2017/0177607 A1 | 6/2017 | Fahey |
| 2017/0221095 A1 | 8/2017 | Gauglitz et al. |
| 2017/0263029 A1 | 9/2017 | Yan et al. |
| 2017/0279751 A1 | 9/2017 | Quirarte et al. |
| 2017/0286994 A1 | 10/2017 | Truong |
| 2017/0287006 A1 | 10/2017 | Azmoodeh et al. |
| 2017/0295250 A1 | 10/2017 | Samaranayake et al. |
| 2017/0301043 A1 | 10/2017 | Soli |
| 2017/0351977 A1 | 12/2017 | Bijor |
| 2017/0357950 A1 | 12/2017 | Bennett et al. |
| 2017/0374003 A1 | 12/2017 | Allen et al. |
| 2017/0374508 A1 | 12/2017 | Davis et al. |
| 2018/0013861 A1 | 1/2018 | Howard et al. |
| 2018/0054487 A1 | 2/2018 | Hebsur et al. |
| 2018/0191831 A1 | 7/2018 | Wadley et al. |
| 2018/0227376 A1 | 8/2018 | Schneider et al. |
| 2018/0241705 A1 | 8/2018 | Sarafa et al. |
| 2018/0246623 A1 | 8/2018 | Peled et al. |
| 2018/0246983 A1 | 8/2018 | Rathod |
| 2018/0253901 A1 | 9/2018 | Chariton et al. |
| 2018/0329622 A1 | 11/2018 | Missig et al. |
| 2018/0332446 A1 | 11/2018 | Seidman |
| 2018/0336644 A1 | 11/2018 | Albertine et al. |
| 2018/0350144 A1 | 12/2018 | Rathod |
| 2018/0351888 A1 | 12/2018 | Howard |
| 2018/0351895 A1 | 12/2018 | Rathod |
| 2018/0357609 A1 | 12/2018 | Hwacinski et al. |
| 2019/0018848 A1 | 1/2019 | Lee |
| 2019/0052587 A1 | 2/2019 | Andreou et al. |
| 2019/0188752 A1 | 6/2019 | Jones |
| 2019/0199907 A1 | 6/2019 | Daulton |
| 2019/0205841 A1 | 7/2019 | Burlin et al. |
| 2019/0287418 A1 | 9/2019 | Rabie |
| 2019/0333023 A1 | 10/2019 | Foran |
| 2019/0356620 A1 | 11/2019 | Presley et al. |
| 2019/0392399 A1 | 12/2019 | Horne |
| 2020/0112450 A1 | 4/2020 | Chhabra et al. |
| 2020/0120170 A1 | 4/2020 | Amitay et al. |
| 2020/0177965 A1 | 6/2020 | Fawcett et al. |
| 2020/0184478 A1 | 6/2020 | Peled et al. |
| 2020/0193390 A1 | 6/2020 | Almanza Ahumada et al. |
| 2020/0358728 A1 | 11/2020 | Andreou et al. |
| 2020/0410453 A1 | 12/2020 | Nalliah et al. |
| 2021/0006519 A1 | 1/2021 | Taitz et al. |
| 2021/0042724 A1 | 2/2021 | Rathod |
| 2021/0203522 A1 | 7/2021 | Kim et al. |
| 2021/0218571 A1 | 7/2021 | Ansari et al. |
| 2021/0226904 A1 | 7/2021 | Taitz et al. |
| 2021/0286510 A1 | 9/2021 | Tyler et al. |
| 2021/0306288 A1 | 9/2021 | Boyd et al. |
| 2021/0336916 A1 | 10/2021 | Boyd et al. |
| 2022/0179665 A1 | 6/2022 | Rathod |
| 2022/0321506 A1 | 10/2022 | Taitz et al. |
| 2022/0377031 A1 | 11/2022 | Boyd et al. |
| 2023/0057193 A1 | 2/2023 | Ansari et al. |
| 2023/0308411 A1 | 9/2023 | Bai et al. |

FOREIGN PATENT DOCUMENTS

| | | |
|---|---|---|
| CN | 1791070 A | 6/2006 |
| CN | 102082740 | 6/2011 |

(56) References Cited

FOREIGN PATENT DOCUMENTS

| | | |
|---|---|---|
| CN | 103457994 A | 12/2013 |
| CN | 103702297 A | 4/2014 |
| CN | 104954402 A | 9/2015 |
| CN | 106789547 A | 5/2017 |
| CN | 106992921 A | 7/2017 |
| CN | 111133723 A | 5/2020 |
| CN | 116567556 | 8/2023 |
| DE | 202016008173 U1 | 6/2017 |
| KR | 101232229 | 2/2013 |
| KR | 20190021973 | 3/2019 |
| KR | 102236593 | 4/2021 |
| KR | 102343824 B1 | 12/2021 |
| WO | 2012000107 | 1/2012 |
| WO | 2013008251 | 1/2013 |
| WO | 2014194262 | 12/2014 |
| WO | 2015192026 | 12/2015 |
| WO | 2016054562 | 4/2016 |
| WO | 2016065131 | 4/2016 |
| WO | 2016/112299 | 7/2016 |
| WO | 2016179166 | 11/2016 |
| WO | 2016179235 | 11/2016 |
| WO | 2017106529 | 6/2017 |
| WO | 2017176739 | 10/2017 |
| WO | 2017176992 | 10/2017 |
| WO | 2018005644 | 1/2018 |
| WO | WO-2019032703 A1 | 2/2019 |
| WO | 2021205240 | 10/2021 |
| WO | 2021216999 | 10/2021 |
| WO | 2023183489 | 9/2023 |

OTHER PUBLICATIONS

U.S. Appl. No. 16/942,061, filed Jul. 29, 2020, Application-Independent Messaging System.
U.S. Appl. No. 16/835,080 U.S. Pat. No. 11,411,900, filed Mar. 30, 2020, Off-Platform Messaging System.
U.S. Appl. No. 17/818,268, filed Aug. 8, 2022, Off-Platform Messaging System.
"U.S. Appl. No. 15/859,237, Final Office Action dated Sep. 6, 2019", 12 pgs.
"U.S. Appl. No. 15/859,237, Non Final Office Action dated Mar. 28, 2019", 11 pgs.
"U.S. Appl. No. 15/859,237, Notice of Allowability dated Sep. 2, 2020", 2 pgs.
"U.S. Appl. No. 15/859,237, Notice of Allowance dated Apr. 22, 2020", 5 pgs.
"U.S. Appl. No. 15/859,237, Response filed Feb. 3, 2020 to Final Office Action dated Sep. 6, 2019", 9 pgs.
"U.S. Appl. No. 15/859,237, Response filed Aug. 28, 2019 to Non Final Office Action dated Mar. 28, 2019", 9 pgs.
"U.S. Appl. No. 15/859,237, Supplemental Notice of Allowability dated May 14, 2020", 2 pgs.
"U.S. Appl. No. 16/503,783, Corrected Notice of Allowability dated Sep. 2, 2021", 2 pgs.
"U.S. Appl. No. 16/503,783, Non Final Office Action dated Oct. 16, 2020", 16 pgs.
"U.S. Appl. No. 16/503,783, Notice of Allowance dated Jan. 11, 2021", 11 pgs.
"U.S. Appl. No. 16/503,783, Notice of Allowance dated May 27, 2021", 5 pgs.
"U.S. Appl. No. 16/503,783, Response filed Dec. 21, 2020 to Non Final Office Action dated Oct. 16, 2020", 12 pgs.
"U.S. Appl. No. 16/835,080, 312 Amendment filed May 9, 2022", 8 pgs.
"U.S. Appl. No. 16/835,080, Corrected Notice of Allowability dated Jul. 6, 2022", 2 pgs.
"U.S. Appl. No. 16/835,080, Examiner Interview Summary dated Jan. 11, 2022", 3 pgs.
"U.S. Appl. No. 16/835,080, Non Final Office Action dated Oct. 8, 2021", 12 pgs.

"U.S. Appl. No. 16/835,080, Notice of Allowance dated Feb. 9, 2022", 9 pgs.
"U.S. Appl. No. 16/835,080, PTO Response to Rule 312 Communication dated May 16, 2022", 2 pgs.
"U.S. Appl. No. 16/835,080, Response filed Jan. 10, 2022 to Non Final Office Action dated Oct. 8, 2021", 12 pgs.
"U.S. Appl. No. 16/942,061, Final Office Action dated Jan. 5, 2023", 19 pgs.
"U.S. Appl. No. 16/942,061, Non Final Office Action dated May 26, 2022", 16 pgs.
"U.S. Appl. No. 16/942,061, Notice of Allowability dated Apr. 12, 2023", 2 pgs.
"U.S. Appl. No. 16/942,061, Notice of Allowance dated Mar. 30, 2023", 5 pgs.
"U.S. Appl. No. 16/942,061, Preliminary Amendment filed Aug. 31, 2020", 7 pgs.
"U.S. Appl. No. 16/942,061, Response filed Mar. 3, 2023 to Final Office Action dated Jan. 5, 2023", 10 pgs.
"U.S. Appl. No. 16/942,061, Response filed Sep. 23, 2022 to Non Final Office Action dated May 26, 2022", 9 pgs.
"U.S. Appl. No. 17/222,247, Non Final Office Action dated Jan. 5, 2022", 9 pgs.
"U.S. Appl. No. 17/222,247, Notice of Allowance dated Apr. 12, 2022", 11 pgs.
"U.S. Appl. No. 17/222,247, Response filed Mar. 22, 2022 to Non Final Office Action dated Jan. 5, 2022", 7 pgs.
"U.S. Appl. No. 17/818,268, Preliminary Amendment filed Oct. 6, 2022", 8 pgs.
"Chinese Application Serial No. 201880057966.5, Response filed May 7, 2022 to Office Action dated Feb. 22, 2022", w/ English Claims, 9 pgs.
"Chinese Application Serial No. 201880057966.5, Decision of Rejection dated Aug. 12, 2022", w/ English Translation, 14 pgs.
"Chinese Application Serial No. 201880057966.5, Office Action dated Feb. 22, 2022", w/ English translation, 12 pgs.
"Chinese Application Serial No. 201880057966.5, Office Action dated Jun. 28, 2021", w/ English Translation, 14 pgs.
"Chinese Application Serial No. 201880057966.5, Response filed Nov. 7, 2022 to Decision of Rejection dated Aug. 12, 2022", w/ English Claims, 12 pgs.
"Chinese Application Serial No. 201880057966.5, Response filed Nov. 12, 2021 to Office Action dated Jun. 28, 2021", w/ English Claims, 13 pgs.
"European Application Serial No. 18842992.2, Communication Pursuant to Article 94(3) EPC dated Aug. 4, 2021", 10 pgs.
"European Application Serial No. 18842992.2, Extended European Search Report dated Jul. 20, 2020", 10 pgs.
"International Application Serial No. PCT/US2018/045815, International Preliminary Report on Patentability dated Feb. 20, 2020", 9 pgs.
"International Application Serial No. PCT/US2018/045815, International Search Report dated Nov. 28, 2018", 3 pgs.
"International Application Serial No. PCT/US2018/045815, Written Opinion dated Nov. 28, 2018", 7 pgs.
"Korean Application Serial No. 10-2020-7006769, Notice of Preliminary Rejection dated Apr. 2, 2021", w/ English Translation, 10 pgs.
"Korean Application Serial No. 10-2020-7006769, Response filed Jul. 8, 2021 to Notice of Preliminary Rejection dated Apr. 2, 2021", w/ English Claims, 18 pgs.
"Surprise!", [Online] Retrieved from the Internet: <URL: https://www.snap.com/en-us/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Christensson, Per, "Link Definition", TechTerms.com, [Online] Retrieved from the internet: <https://techterms.com/definition/link>, (Jun. 13, 2017), 2 pgs.
Etherington, Darrell, "Snapchat Gets Its Own Timeline With Snapchat Stories, 24-Hour Photo & Video Tales", [Online] Retrieved from the

(56) References Cited

OTHER PUBLICATIONS

Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
"U.S. Appl. No. 16/856,811, Non Final Office Action dated Jun. 9, 2021", 20 pgs.
"International Application Serial No. PCT/US2021/028840, International Search Report dated Aug. 12, 2021", 3 pgs.
"International Application Serial No. PCT/US2021/028840, Written Opinion dated Aug. 12, 2021", 4 pgs.
"U.S. Appl. No. 16/856,811, Response filed Sep. 9, 2021 to Non Final Office Action dated Jun. 9, 2021", 11 pgs.
"U.S. Appl. No. 16/856,811, Final Office Action dated Dec. 27, 2021", 21 pgs.
"U.S. Appl. No. 16/856,811, Response filed Apr. 27, 2022 to Final Office Action dated Dec. 27, 2021", 10 pgs.
"U.S. Appl. No. 16/856,811, Non Final Office Action dated May 11, 2022", 23 pgs.
"U.S. Appl. No. 17/222,247, Corrected Notice of Allowability dated Jul. 7, 2022", 2 pgs.
"U.S. Appl. No. 17/843,858, Non Final Office Action dated Jan. 5, 2023", 8 pgs.
"U.S. Appl. No. 17/843,858, Response filed Feb. 22, 2023 to Non Final Office Action dated Jan. 5, 2023", 7 pgs.
"U.S. Appl. No. 17/843,858, Notice of Allowance dated Mar. 17, 2023", 11 pgs.
"International Application Serial No. PCT/US2023/016081, International Search Report dated Jul. 17, 2023", 3 pgs.
"International Application Serial No. PCT/US2023/016081, Written Opinion dated Jul. 17, 2023", 4 pgs.
"U.S. Appl. No. 17/818,268, Non Final Office Action dated Jul. 25, 2023", 11 pgs.
"U.S. Appl. No. 16/942,061, Corrected Notice of Allowability dated Sep. 1, 2023", 2 pgs.
"U.S. Appl. No. 18/132,267, Non Final Office Action dated Sep. 14, 2023", 12 pgs.
"International Application Serial No. PCT/US2023/024011, International Search Report dated Sep. 25, 2023", 4 pgs.
"International Application Serial No. PCT/US2023/024011, Written Opinion dated Sep. 25, 2023", 3 pgs.
"European Application Serial No. 18842992.2, Communication Pursuant to Article 94(3) EPC dated Sep. 28, 2023", 13 pgs.
Castelluccia, Claude, "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptit>, (Dec. 13, 2005), 2 pgs.
"U.S. Appl. No. 17/818,268, Response filed Oct. 24, 2023 to Non Final Office Action dated Jul. 25, 2023", 12 pgs.
"U.S. Appl. No. 16/942,061, Corrected Notice of Allowability dated Oct. 25, 2023", 2 pgs.
"U.S. Appl. No. 17/818,268, Final Office Action dated Nov. 8, 2023", 8 pgs.

* cited by examiner

APPLICATION-INDEPENDENT MESSAGING SYSTEM

PRIORITY

This application is a continuation of U.S. patent application Ser. No. 16/942,061, filed on Jul. 29, 2020, which is a continuation of U.S. patent application Ser. No. 15/859,237, filed on Dec. 29, 2017, which claims the benefit of priority of U.S. Provisional Patent Application Ser. No. 62/542,629, filed on Aug. 8, 2017, which applications are incorporated by reference herein in their entireties.

BACKGROUND

The popularity of electronic messaging, particularly instant messaging, continues to grow. Users increasingly share media content items such as electronic images and videos with each other. Users also increasingly utilize their mobile devices to communicate with each other using chat and message programs. In some cases, a user's contacts may not use the same messaging application as the user. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by allowing senders to transmit messages and content using a messaging system, and recipients to access such messages and content, even if the recipients do not have access to the messaging system.

Figure 1:
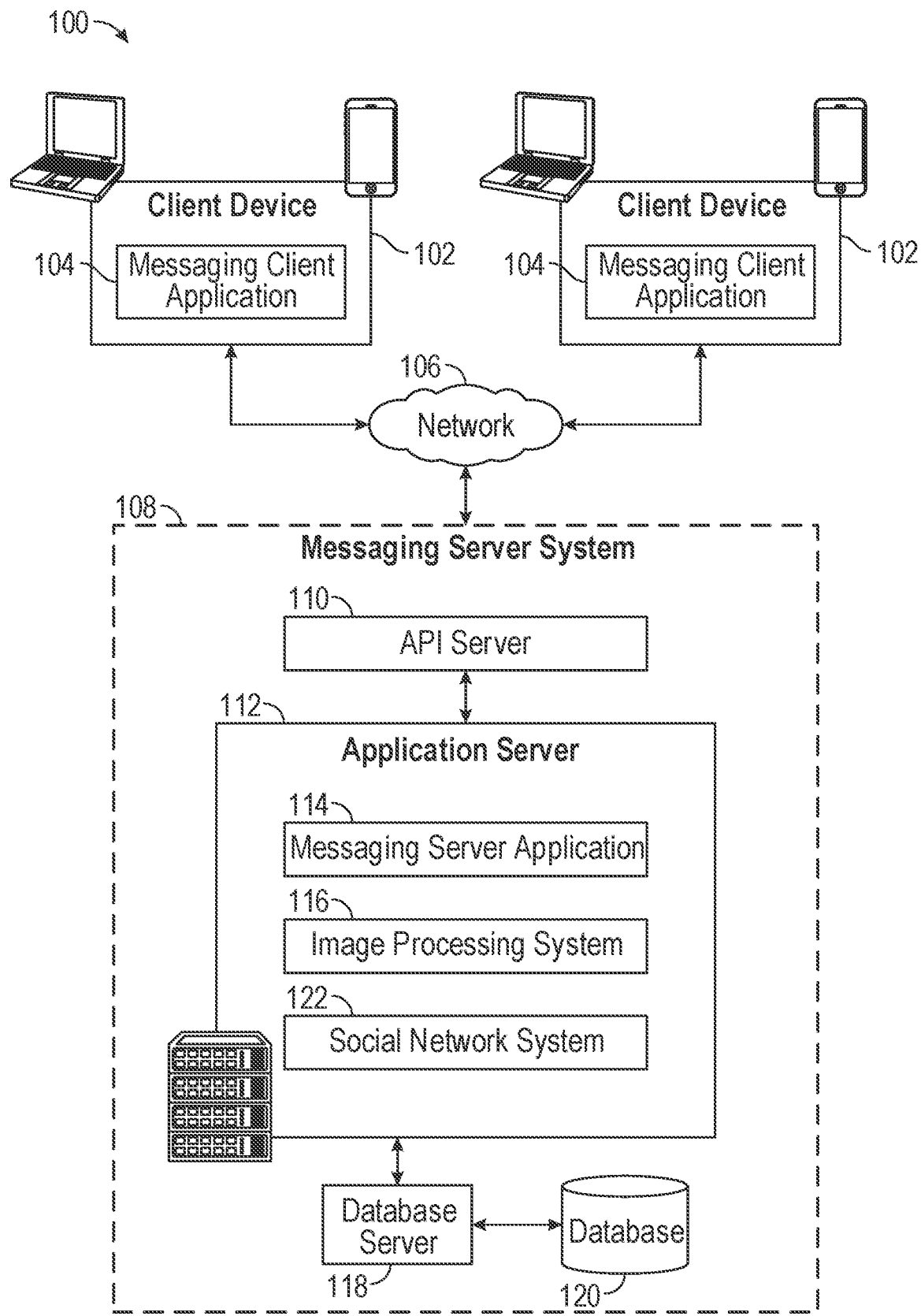
FIG. 1 is a block diagram showing an example messaging system for exchanging data (e.g., messages and associated content) over a network.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of electronic media files (e.g., electronic images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to electronic images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

Figure 2:
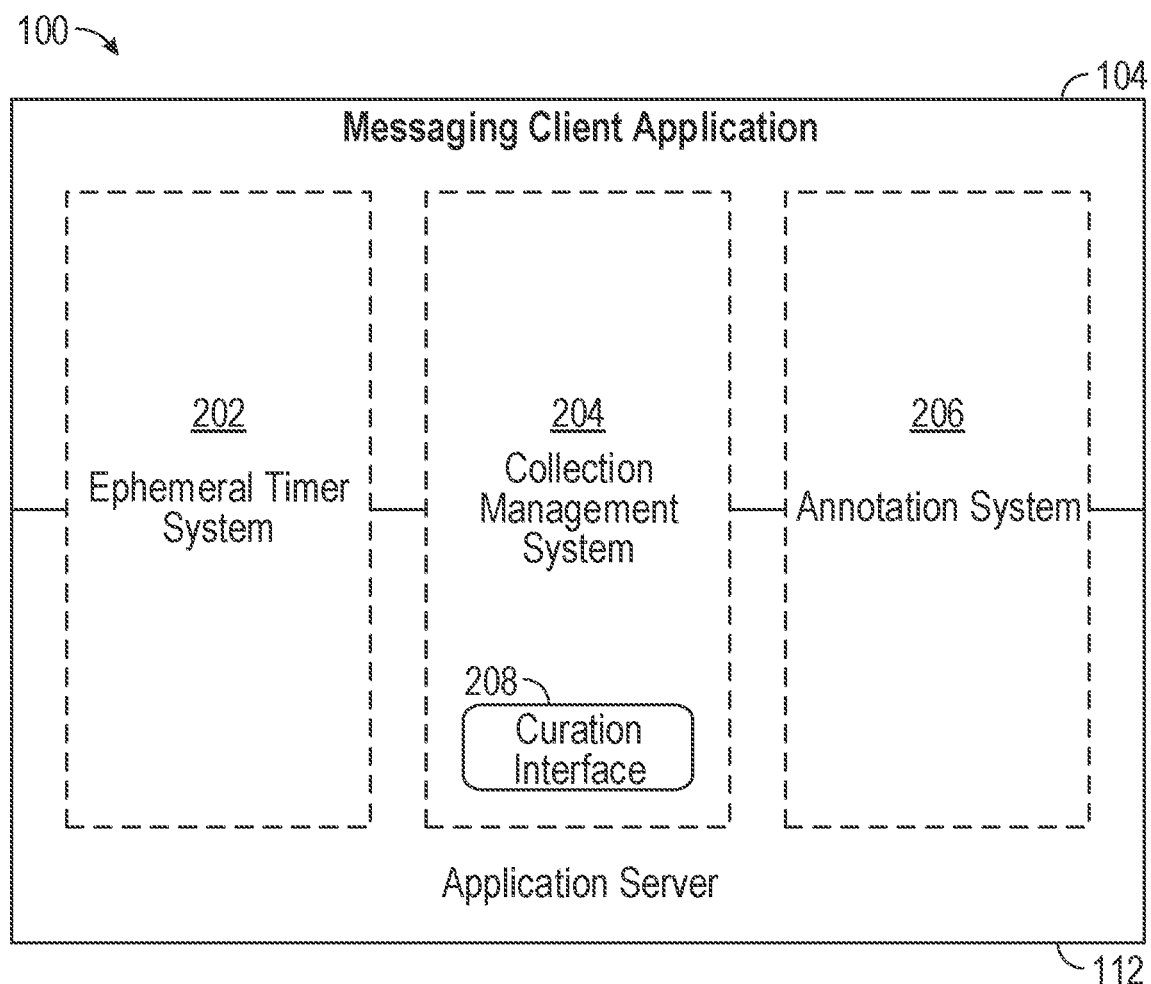
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT® story), selectively display and enable access to messages and associated content via the messaging client application 104.

The collection management system 204 is responsible for managing collections of media (e.g., collections of text, image, video and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT® filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., an image or video) at the client device 102. For example, the media overlay including text that can be overlaid on top of a photograph/electronic image generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some exemplary embodiments, as discussed in more detail below, embodiments of the present disclosure may generate, display, distribute, and apply media overlays to media content items. For example, embodiments may utilize media content items generated by a client device 102 (e.g., an image or video captured using a digital camera coupled to the client device 102) to generate media overlays that can be applied to other media content items.

Figure 3:
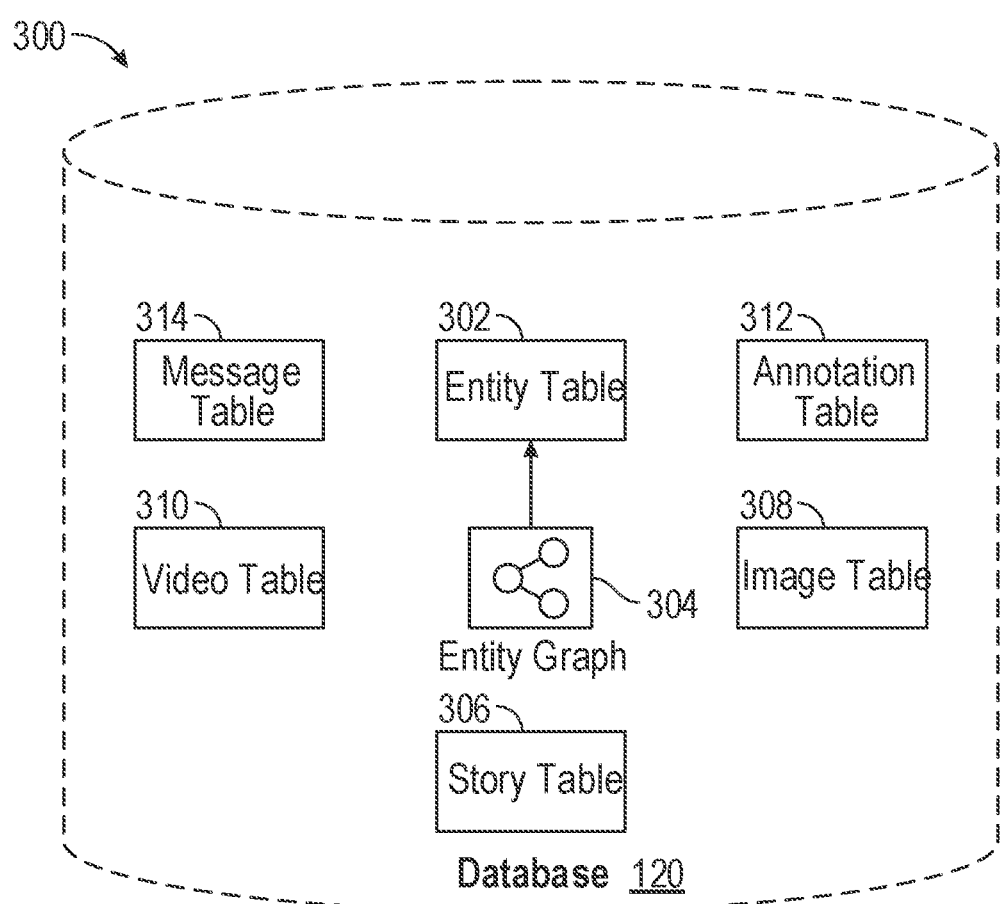
FIG. 3 is a schematic diagram illustrating data which may be stored in the database of the messaging server system, according to various exemplary embodiments.

FIG. 3 is a schematic diagram 300 illustrating data 300 that is stored in the database 120 of the messaging server system 108, according to certain exemplary embodiments. While the content of the database 120 is shown to comprise a number of tables, the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message.

Other types of filters include geolocation filters (also known as Geofilters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time. Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT® story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages/communications such as short message service (SMS) or multimedia message service (MMS) texts and emails. The customized images may also be utilized in conjunction with the SNAPCHAT stories, SNAPCHAT filters, and ephemeral messaging functionality discussed herein. Embodiments of the present disclosure may transmit and receive electronic communications containing media content items, media overlays, and/or other content (or links to such content as described below) using any form of electronic communication, such as SMS texts, MMS texts, emails, and other communications.

Figure 4:
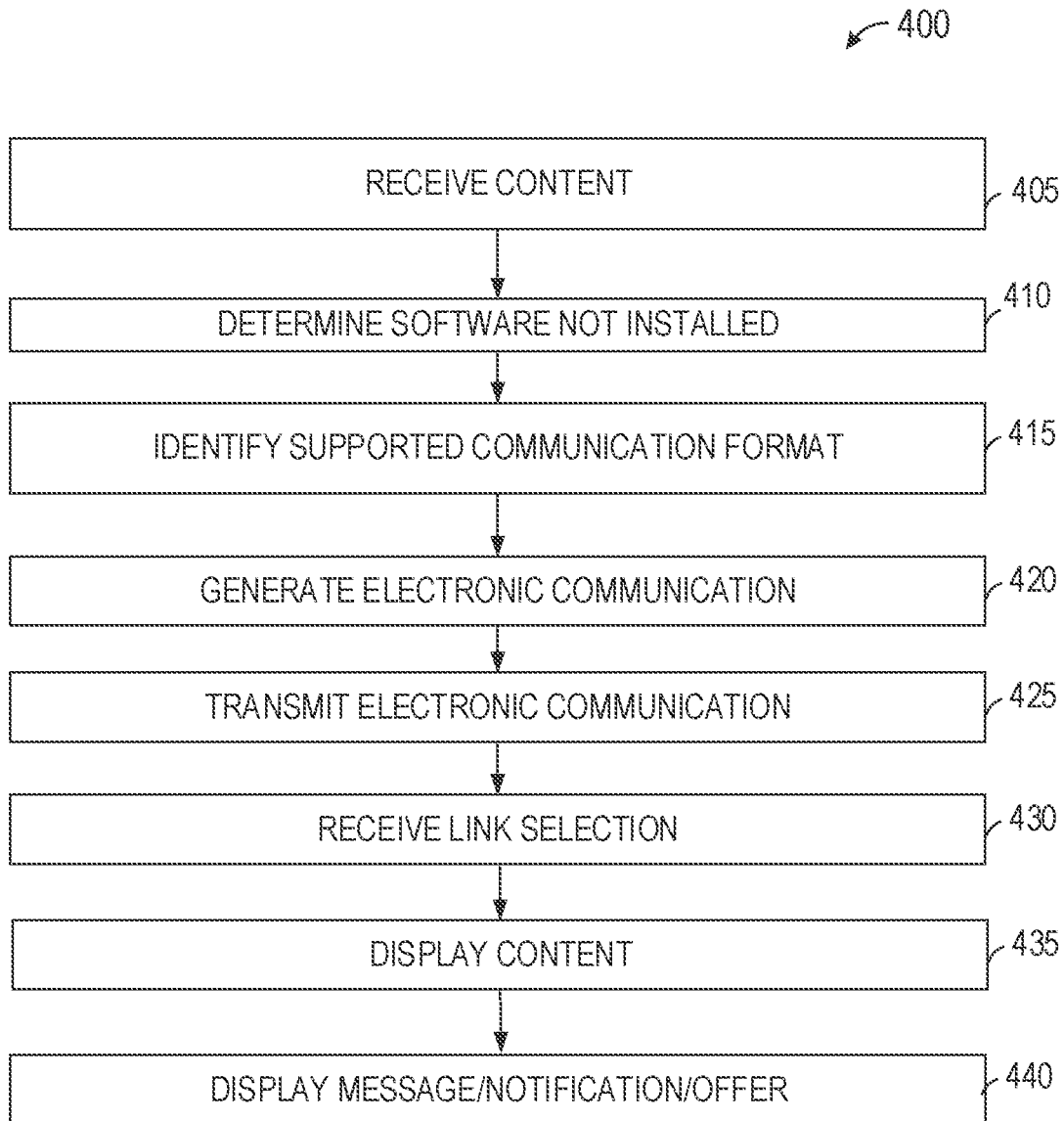
FIG. 4 is a flow diagram of an exemplary process according to various aspects of the disclosure.

FIG. 4 depicts an exemplary process according to various aspects of the present disclosure. In this example, method 400 includes receiving content adapted for display by a software application from a sender (405) and addressed to a recipient, and determining the software application is not installed on a computing device of the recipient (410). The method further includes, in response to determining the software application is not installed on the computing device of the recipient: identifying an electronic communication supported by the recipient's computing device (415), generating an electronic communication in the supported format containing a link to the content (420), and transmitting the electronic communication to the recipient's computing device (425). Method 400 further includes receiving a selection of the link to the content from the recipient's computing device (430), displaying the content on the recipient's computing device (435), and displaying on the recipient's computing device one or more of: a message, a notification, and an offer to install the software application (440). The steps of method 400 may be performed in whole or in part, may be performed in conjunction each other as well as with some or all of the steps in other methods, and may be performed by any number of different systems, such as the systems described in FIGS. 1 and 7.

Figure 5A:
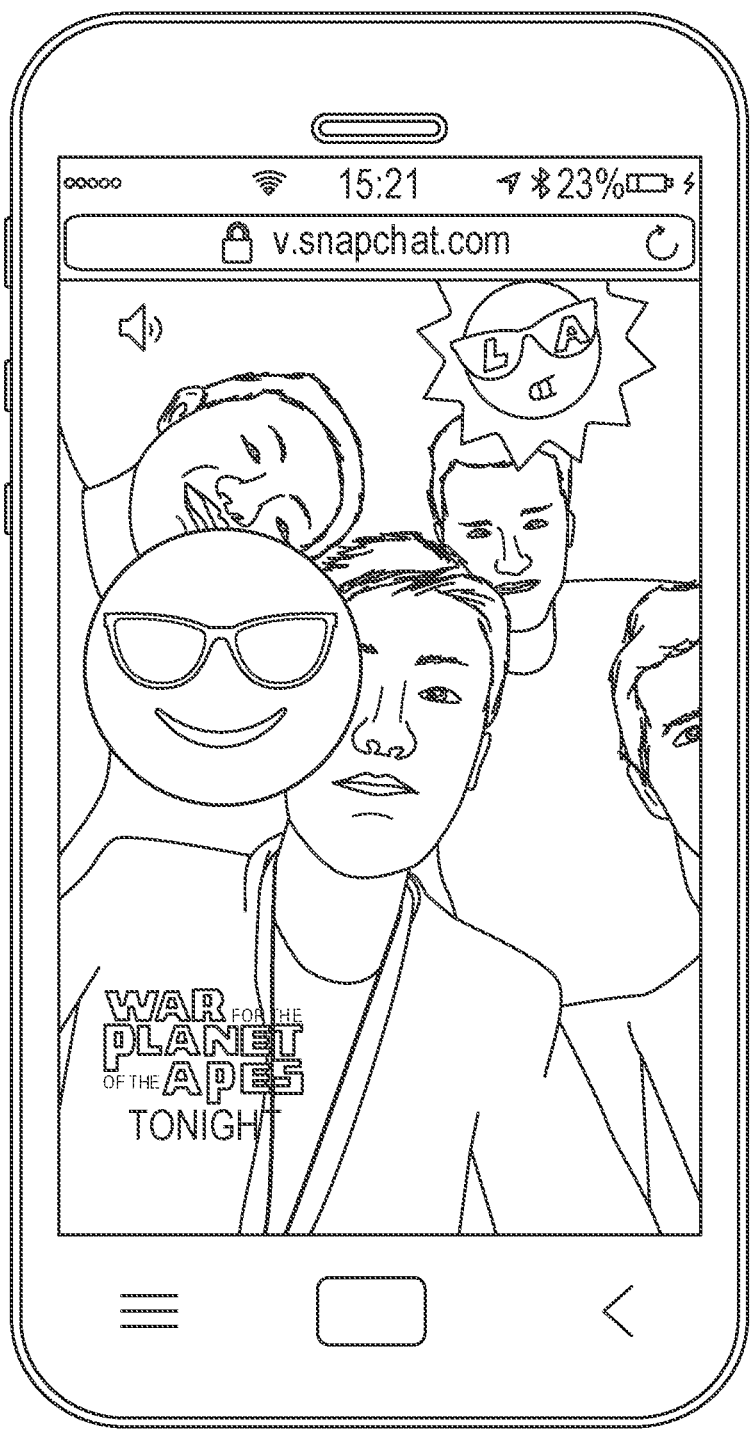
FIGS. 5A-5F are screenshots illustrating some aspects of the method described in FIG. 4.

Embodiments of the present disclosure may receive content (405) adapted for use with a variety of different software applications, such as messaging applications. For example, a first user may generate content (such as an image, video, audio, etc.) using a messaging application installed on the first user's computing device, such as "Snapchat" by Snap, Inc. The messaging software application may provide a variety of custom features that allow the content to be displayed on the user's computing device, such as by applying various filters as described above. FIG. 5A depicts an example of content generated by a first user's computing device (a smartphone in this example), namely an image captured using the camera of the smartphone with several media overlays applied (two smiley face "stickers" and text providing an invitation to a movie in the lower-left corner.

The content may be addressed to, or otherwise designated for distribution to, any number of different users or computing devices. For example, the first user may generate content (e.g. an image containing a filter) using a messaging software application installed on the user's computing device (e.g., the first user's smartphone or other mobile device) and address the content to a group of other users from a list of contacts stored on the first user's device.

The system may determine (410) whether or not the software adapted to display the content (the messaging software application in this example) is installed on the computing devices associated with the recipient users. Continuing the example from above, the system may determine that out of three recipient users, the computing device of one user (referred to hereafter as the "second user") does not have the software installed, whereas the software is installed on the devices of the other two users. In this case, the system may transmit the content to the devices of the two users having the software application normally.

The system may determine (410) whether software is installed on a user's computing device using a variety of different methods and information. In some embodiments, the system transmits a request to the recipient's computing device to identify whether the software is installed. Additionally or alternatively, the system may scan the registry of a computing device to determine if the software application is installed. The system may also transmit a communication to the device designated for the software application and use the response from the software application (or lack thereof if the application is not present) to determine if the software is installed. The system may also attempt to identify the recipient user within a registry of users of the software application maintained by the system (e.g., by determining if the user has an account associated with the software).

For a device the system determines does not have the software installed (e.g., the second user's computing device from the example above), the system identifies (415) a communication format that is currently supported by the device. The system may identify a supported communication format in a variety of different ways, including by detecting various messaging applications operating on the device as described in the preceding paragraph. For example, the system may identify an alternate messaging application present on the user's device, such as an email application or text message application capable of supporting Short Message Service (SMS) and Multimedia Message Service (MMS) text messages. The system generates (420) a communication in the supported format and that contains a link to the content generated by the first user on the first computing device, and transmits (425) the electronic communication to the device. In some embodiments, the may store the content (e.g., in a database in communication with the system) and direct the link to the stored content.

In the exemplary method 400 shown in FIG. 4, the system receives a selection (430) of the link in the communication (e.g. by the second user, selecting the link via a user interface of the second user's computing device) and displays the content (435) on the display screen of the second user's computing device. In one example, the system displays the content via a web-based interface that displays the content when the second user selects the link in Hyper Text Markup Language (HTML) format. The system may display content such as the image illustrated in FIG. 5A on the second user's computing device.

Figure 5B:
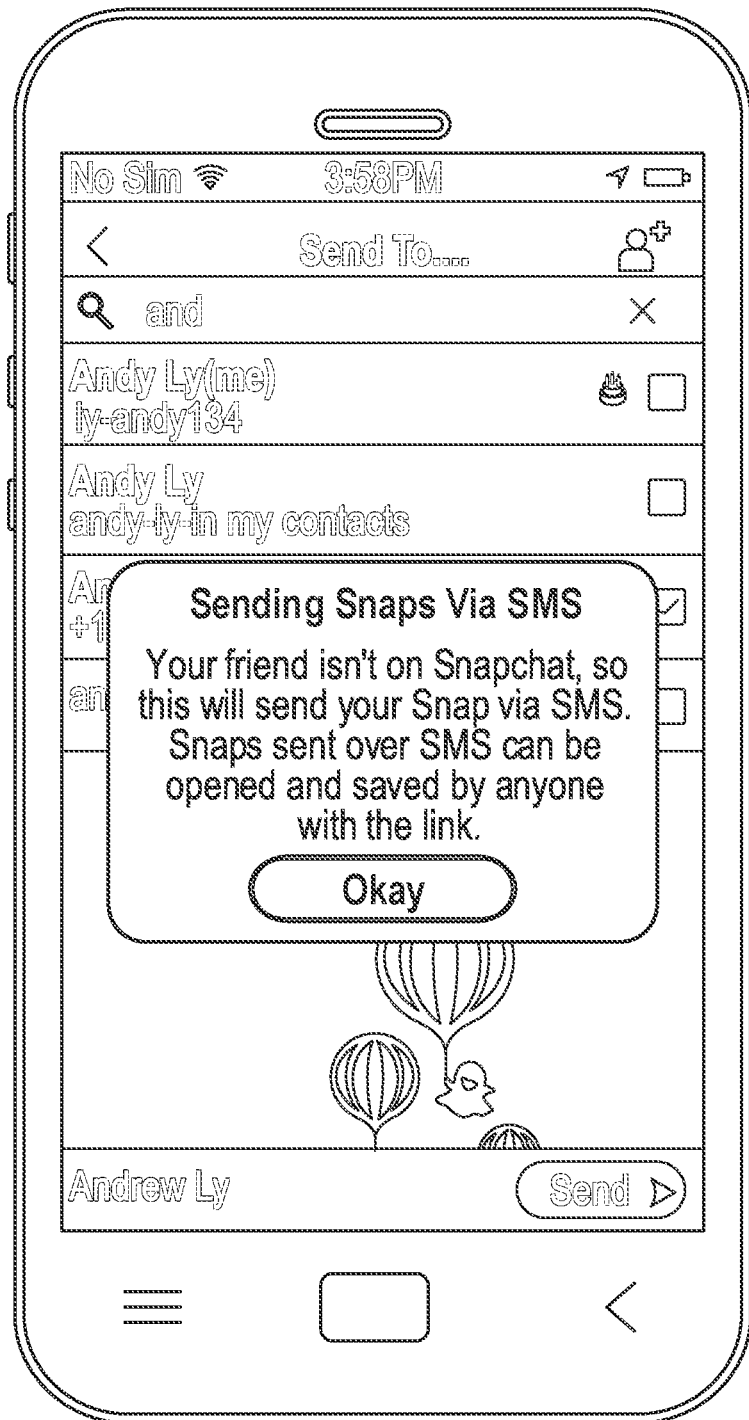
Figure 5C:
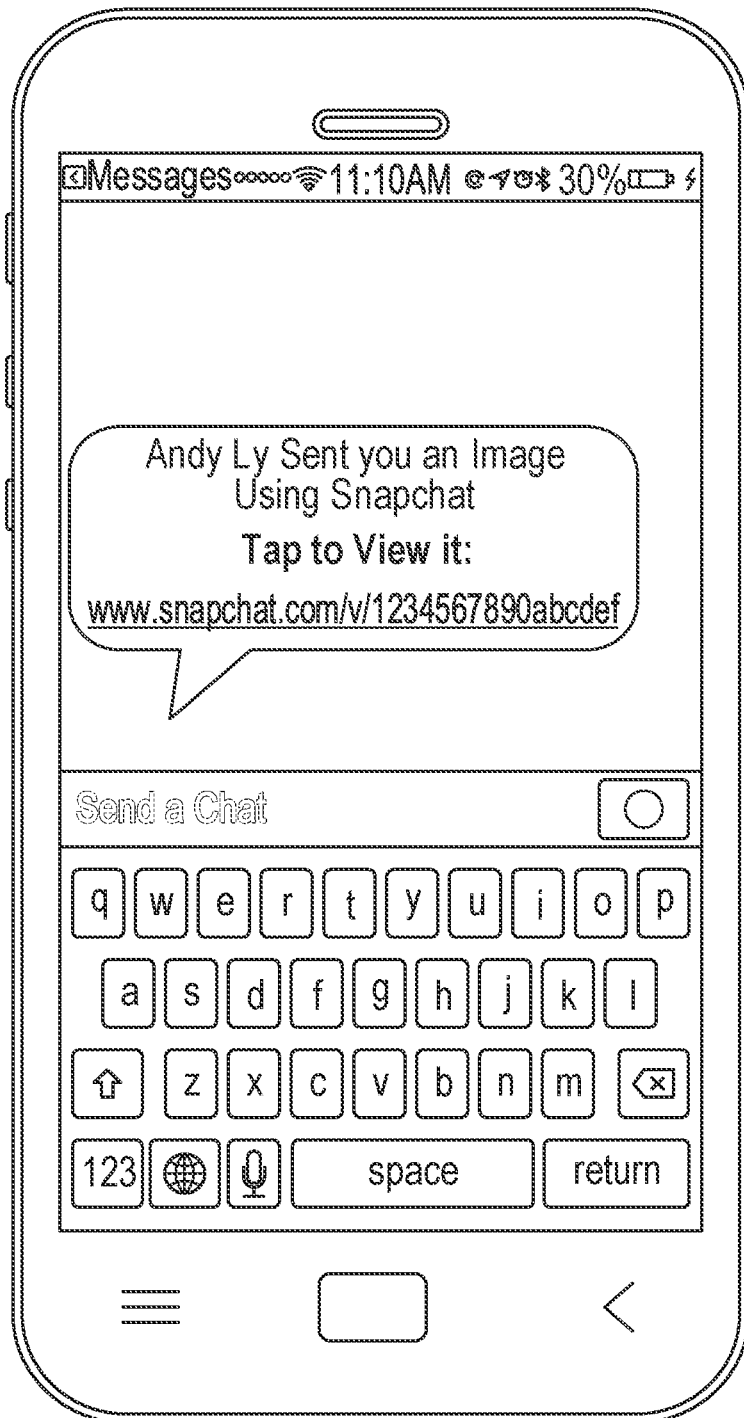

The system may display (440) a variety of messages, notifications, offers and other content to the sending user (e.g., the first user in the example above) as well as the recipient user (e.g., the second user in the example above). In FIG. 5B, for example, the system displays (440) a message on the display screen of the first user indicating that one of the recipients of the user's content (from FIG. 5A) does not have the messaging application (Snapchat) installed to view the content, and indicates the content will be instead be provided to the recipient via a link transmitted by SMS text. FIG. 5C depicts the SMS text message displayed on the screen of the second user's computing device. In this example, the text message contains information about the content and the link to the content.

Figure 5D:
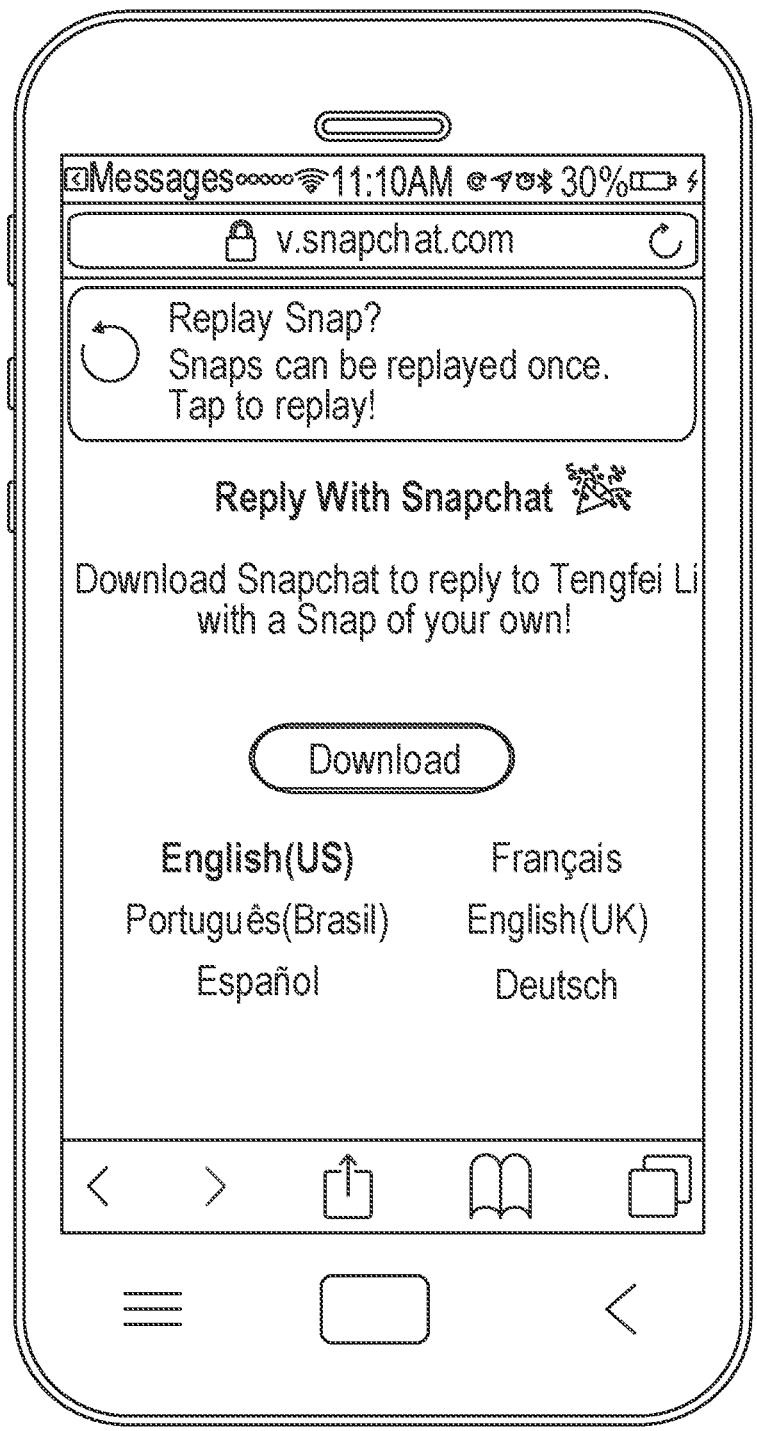

Among other things embodiments of the present disclosure may help enforce viewing restrictions on the content. In some embodiments, for example, they system may cause the content to be displayed on the display screen of a user's computing device for a predetermined period of times, and/or a predetermined number of times. In FIG. 5D, for example, the system displays a message (440) on the display screen of the second user's computing device notifying the second user that the content ("Snaps" in this example) can only be replayed once, and providing an option for the second user to replay/redisplay the content. Additionally, the example in FIG. 5D displays an offer to install the messaging software application (Snapchat) used to create the content. In this manner, embodiments of the present disclosure not only provide access to content for users without a particular software application, but help expand the user base of the software application in conjunction with exposing non-users to the content generated by the application.

Figure 5E:
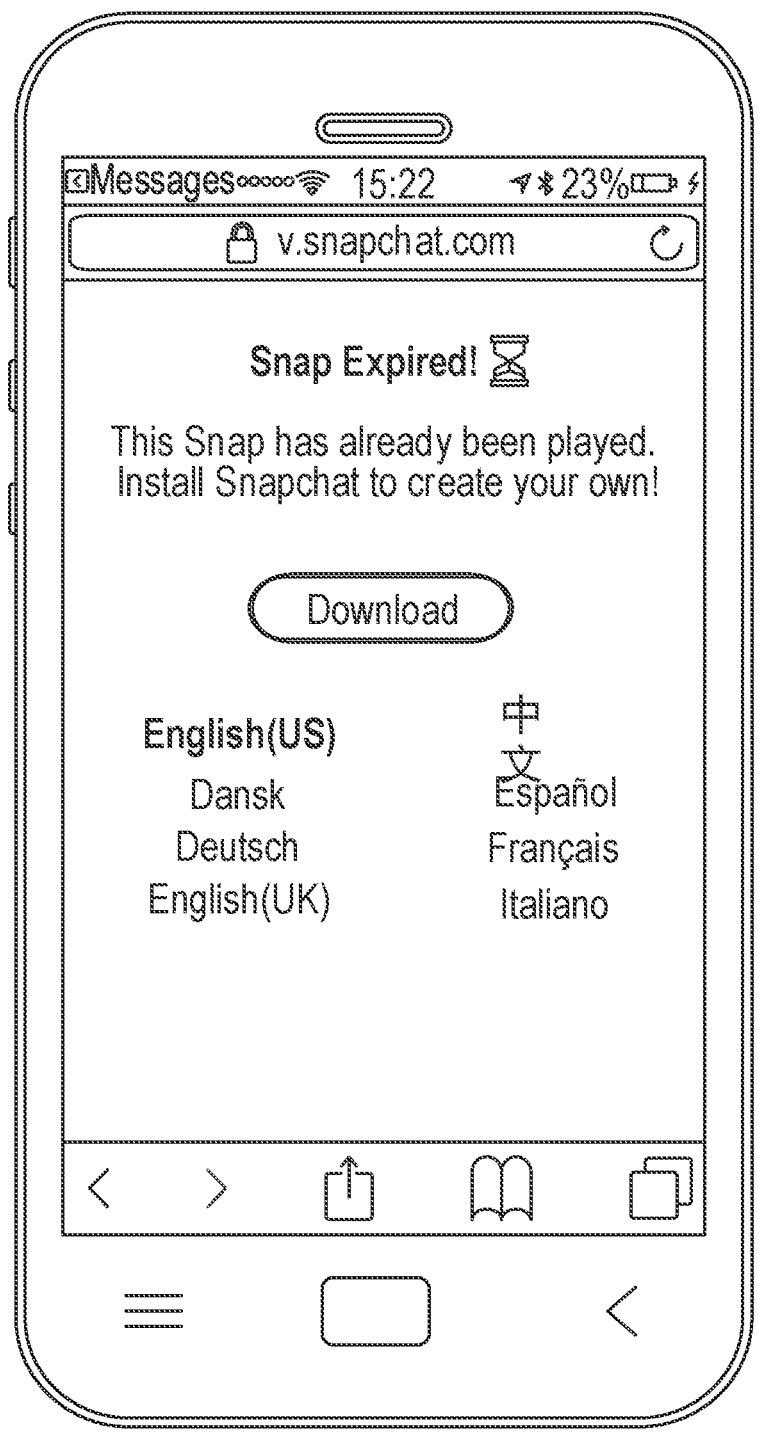
Figure 5F:

The system may cause a user's system to display a message (440) that the content is no longer accessible once a restriction requirement is satisfied. Referring now to FIG. 5E, for example, a message is displayed to the user after the content has been displayed a predetermined number of times. A similar message could be displayed after a predetermined time limit to view the content has expired. The system may also remove content (e.g., delete it from storage in a database to which the link is directed) and display a general message that the content cannot be found after such a deletion, as shown in FIG. 5F.

In some embodiments, the system may allow a predetermined number of views of content without installing the software application by a user, but pre-empt further such uses. For example, the first user may create a plurality of content items and address them for delivery to the second user via the system. The system may generate and transmit a respective communication containing a respective link for each content item in a first subset of the content items to the second user, but also display (e.g., on the display screen of the second user's computing device) a notification that viewing content in a second subset of the content items requires installation of the software application on the second user's computing device. In a particular example, consider that the first user generates five content items (e.g., images with stickers as in FIG. 5A) and addresses them to the second user. The system may provide SMS text messages with links to two of the messages, but also a notification that the second user must download the messaging software application to view the remaining three messages.

Figure 5G:
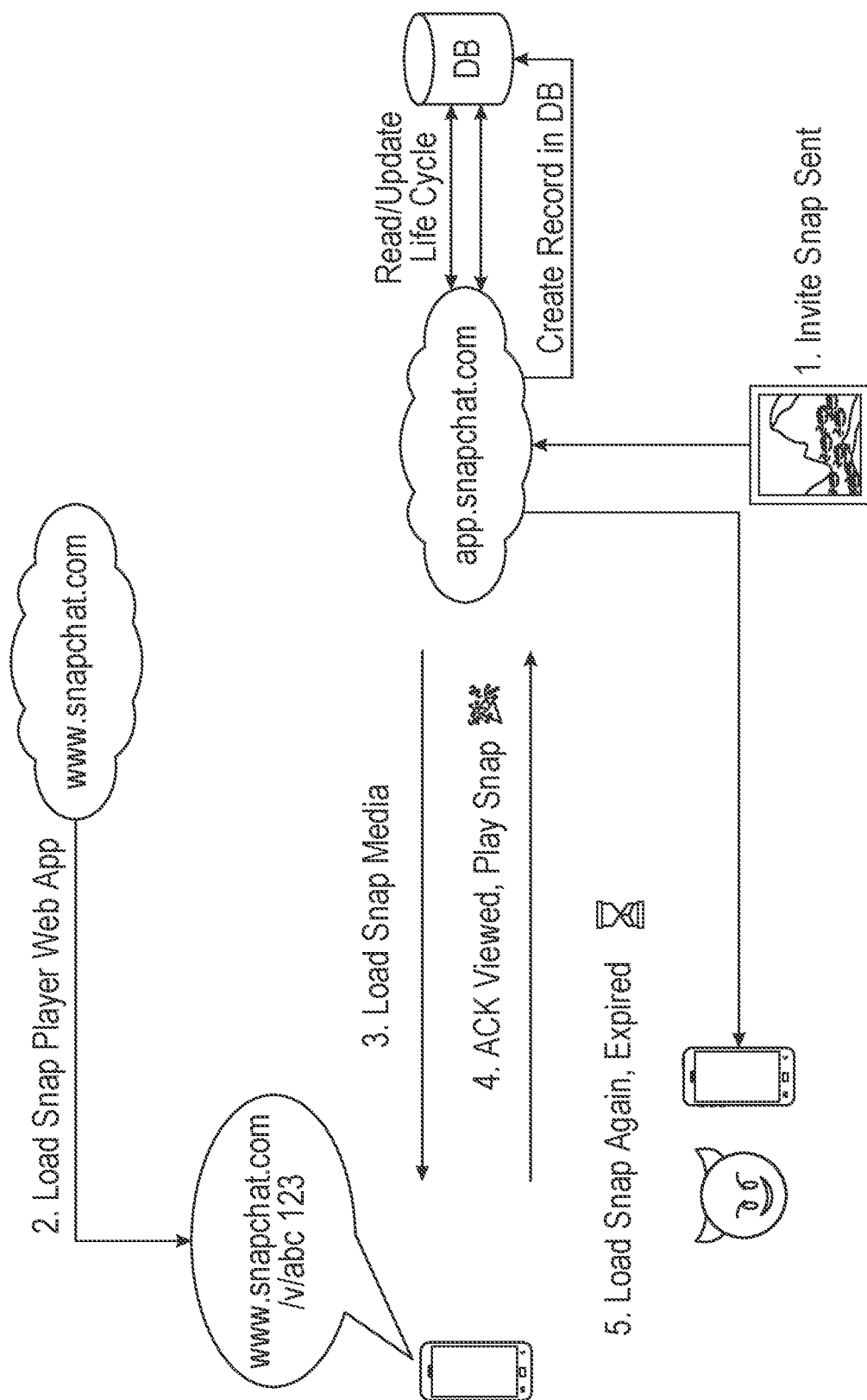
FIGS. 5G and 5H are diagrams illustrating various aspects of the present disclosure.
Figure 5H:
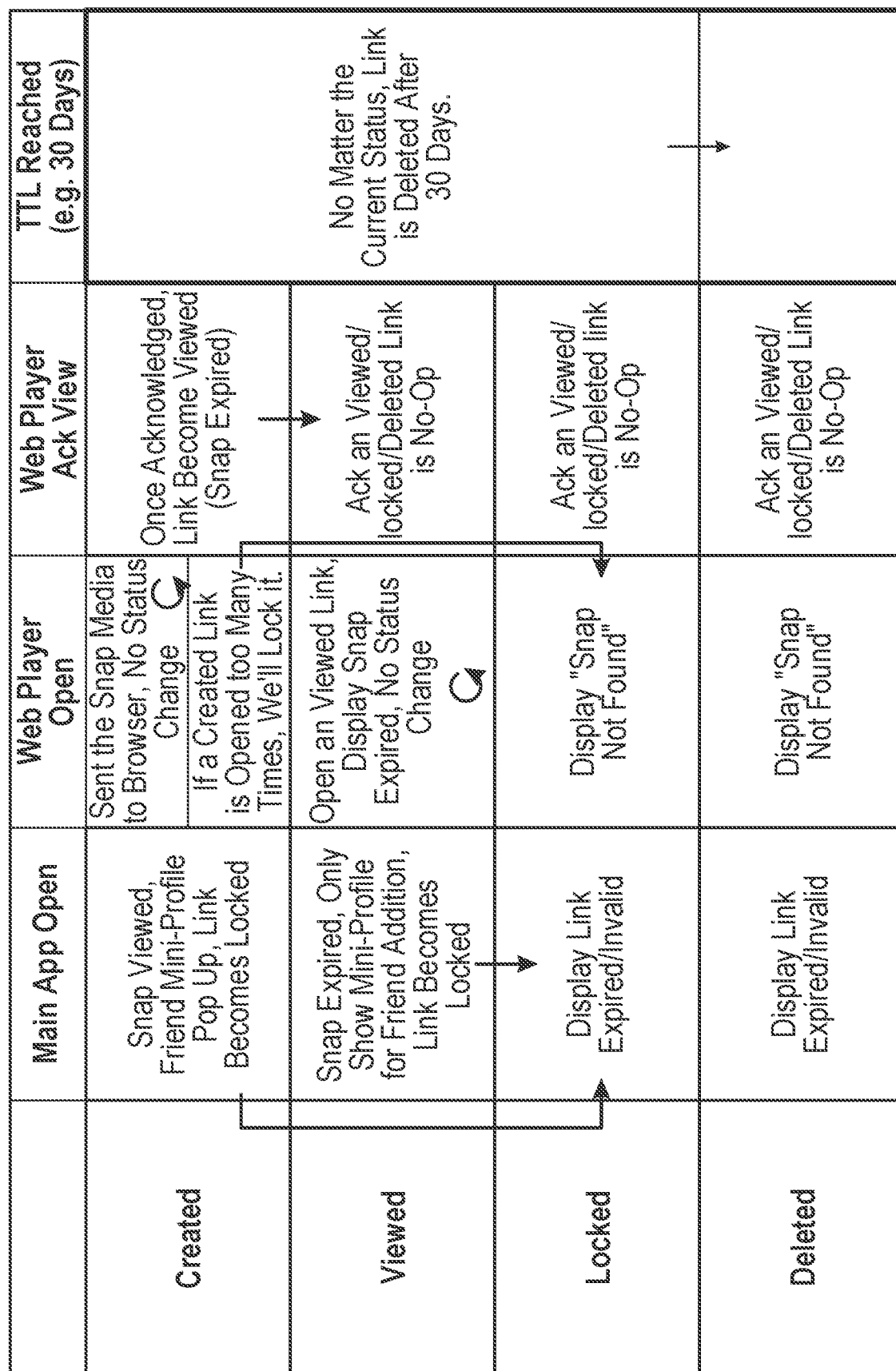

FIG. 5G illustrates another exemplary process according to various aspects of the present disclosure. In step 1 of this example, a first user of the Snapchat messaging application creates content (a "Snap") and sends addresses the content to a second user via the system at "app.snapchat.com." The system creates a record in a database associated with the content for later retrieval and monitoring (e.g., for adherence to ephemeral access and other restrictions on the content's read/write life cycle). In step 2, the system determines the second user's computing device does not have the Snapchat messaging application and loads the web-based "Snap Player Web App" to display the content. The content is loaded (step 3) and displayed (step 4). Subsequent attempts to view the Snap may be blocked (step 5) in response to expiration of a predetermined time period and/or display of the content a predetermined number of times. An example of a life cycle of a link to such content is similarly described in the chart depicted in FIG. 5H. In this example, events are listed in the X and Y axes of the chart, the boxes indicate intersections between the events, and the arrows between the boxes indicate state changes.

Software Architecture

Figure 6:
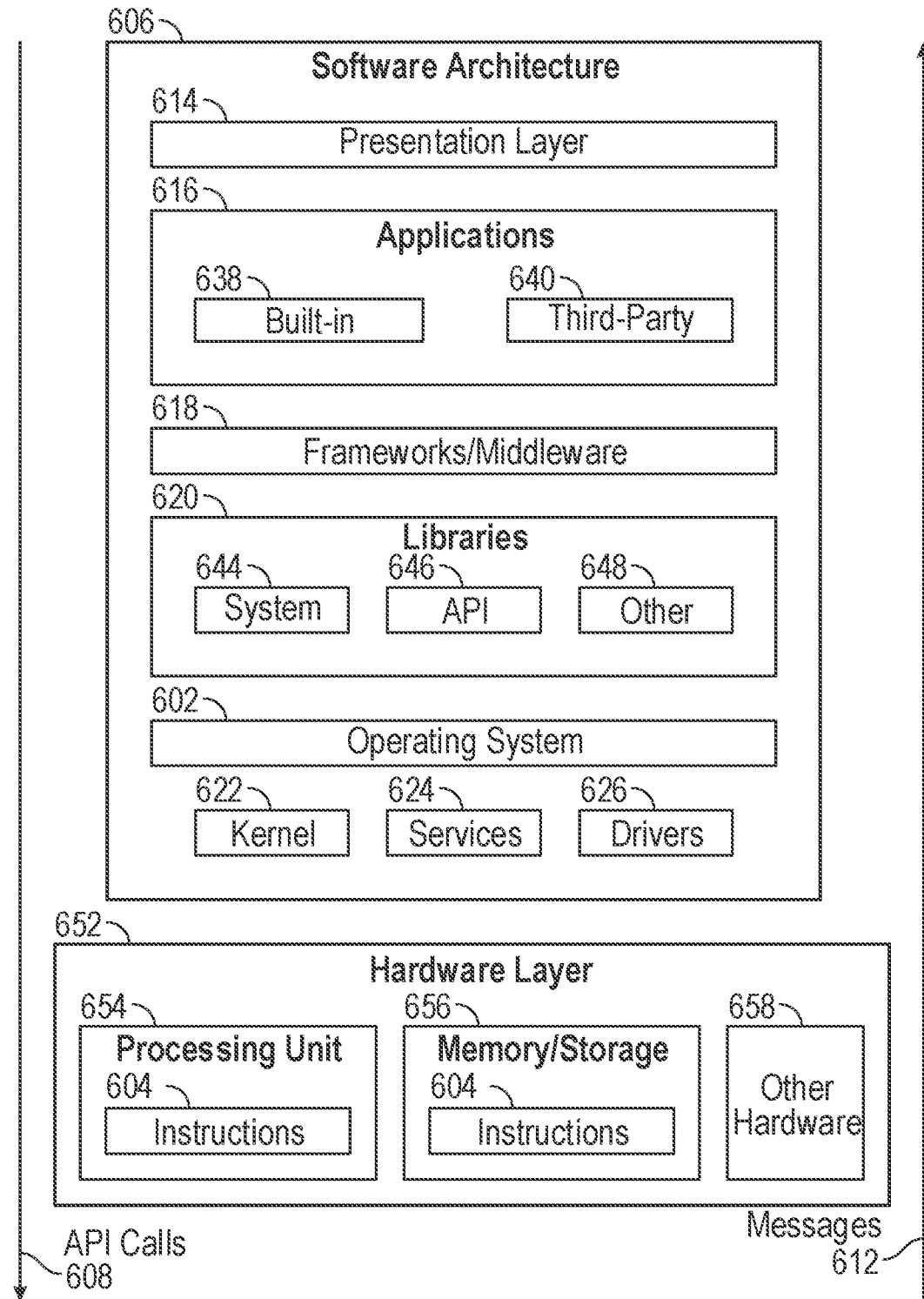
FIG. 6 is a block diagram illustrating a representative software architecture, which may be used in conjunction with various hardware architectures herein described.

FIG. 6 is a block diagram illustrating an exemplary software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 or other components or layers. The libraries 620 provide functionality that allows other software components to perform tasks in an easier fashion than to interface directly with the underlying operating system 602 functionality (e.g., kernel 622, services 624 or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 or other software components/modules, some of which may be specific to a particular operating system 602 or platform.

The applications 616 include built-in applications 638 or third-party applications 640. Examples of representative built-in applications 638 may include, but are not limited to, a contacts application, a browser application, a book reader application, a location application, a media application, a messaging application, or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
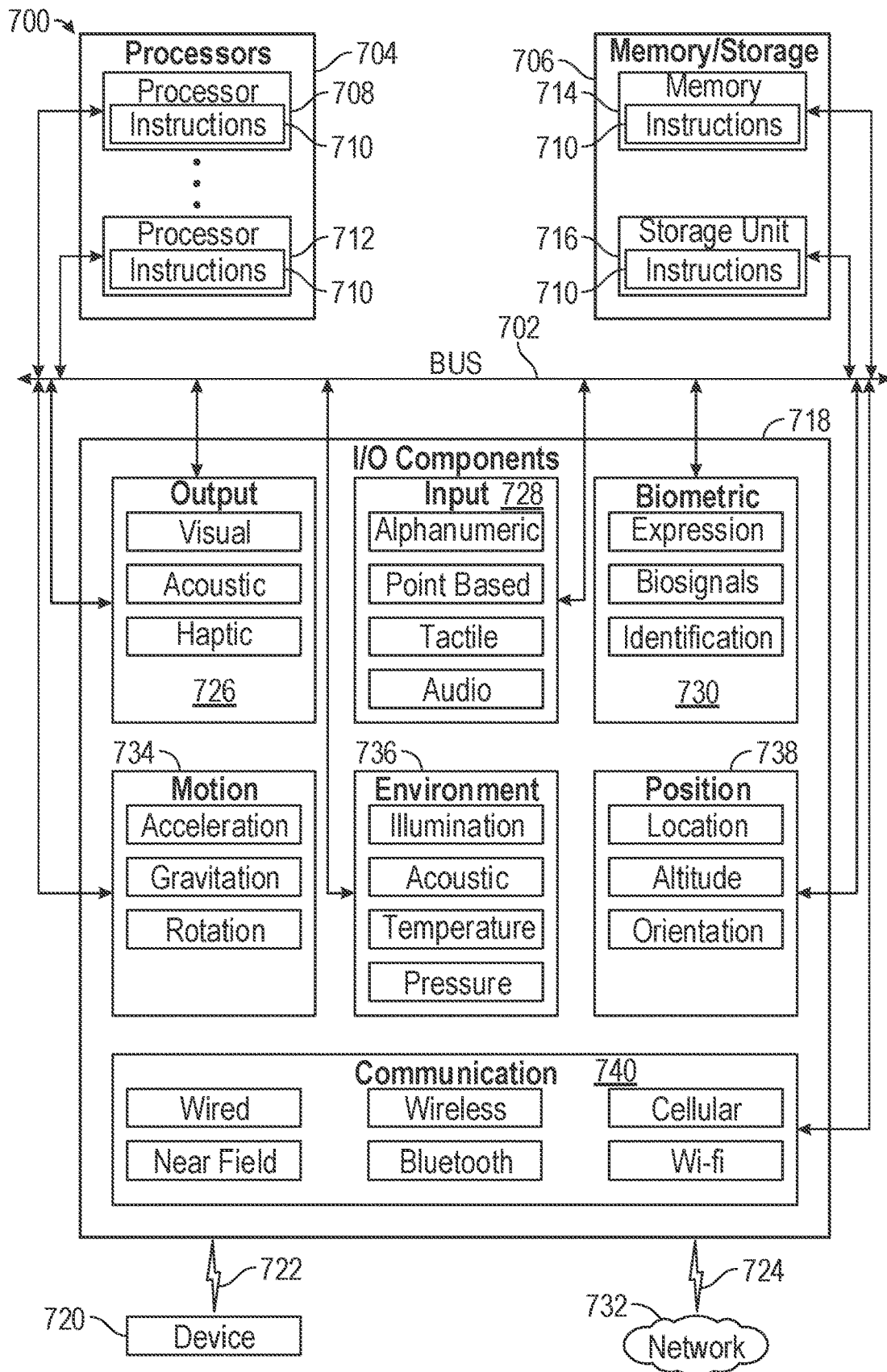
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 728 may also include one or more image-capturing devices, such as a digital camera for generating digital images or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, velocity sensor components (e.g., speedometer), rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
at least one processor; and
at least one memory component storing instructions that, when executed by the at least one processor, cause the at least one processor to perform operations comprising:
receiving, from a first device of a first user, content adapted for display by a software application installed on the first device, the content addressed to a second user;
determining that the second user does not have an account associated with the software application; and
in response to determining that the second user does not have an account associated with the software application:
identifying a supported electronic communication format,
generating an electronic communication in the supported electronic communication format to enable the second user to receive the content,
causing transmission of the electronic communication to a second device of the second user, and
causing presentation of a notification at the first device, the notification indicating that the second user does not have an account associated with the software application.

2. The system of claim 1, wherein determining that the second user does not have an account associated with the software application comprises attempting to identify the second user within a registry of users of the software application.

3. The system of claim 1, wherein the notification further indicates the supported electronic communication format.

4. The system of claim 1, wherein the electronic communication includes a link to enable the second user to access the content, the operations further comprising:
receiving a selection of the link by the second user via a user interface of the second device; and
in response to receiving the selection of the link, causing display of the content on a display of the second device.

5. The system of claim 4, wherein the system causes the content to be displayed on the display of the second device for a predetermined period of time.

6. The system of claim 4, wherein the system allows the content to be displayed on the display of the second device for a predetermined number of times.

7. The system of claim 6, the operations further comprising:
after the content is displayed on the display of the second device for the predetermined number of times, causing display of a message on the display of the second device notifying the second user that the content is no longer accessible.

8. The system of claim 1, wherein the electronic communication includes one or more of: a short message service (SMS) communication, a multimedia service (MMS) communication, and an email.

9. The system of claim 1, wherein generating the electronic communication includes storing the content in a database in communication with the system.

10. The system of claim 1, wherein the content comprises a plurality of content items, and wherein the system limits a number of views with respect to the plurality of content items on the second device.

11. The system of claim 1, wherein the content comprises an image or video with a media overlay applied thereto by the first user using the first device.

12. The system of claim 1, wherein the content comprises an image or video captured by a camera of the first device.

13. A method comprising:
receiving, from a first device of a first user, content adapted for display by a software application installed on the first device, the content addressed to a second user;
determining that the second user does not have an account associated with the software application; and
in response to determining that the second user does not have an account associated with the software application:
identifying a supported electronic communication format,
generating an electronic communication in the supported electronic communication format to enable the second user to receive the content,
causing transmission of the electronic communication to a second device of the second user, and
causing presentation of a notification at the first device, the notification indicating that the second user does not have an account associated with the software application.

14. The method of claim 13, wherein determining that the second user does not have an account associated with the software application comprises attempting to identify the second user within a registry of users of the software application.

15. The method of claim 13, wherein the notification further indicates the supported electronic communication format.

16. The method of claim 13, wherein the electronic communication includes a link to enable the second user to access the content, further comprising:
receiving a selection of the link by the second user via a user interface of the second device; and
in response to receiving the selection of the link, causing display of the content on a display of the second device.

17. The method of claim 13, wherein the electronic communication includes one or more of: a short message service (SMS) communication, a multimedia service (MMS) communication, and an email.

18. A non-transitory computer-readable storage medium storing instructions that, when executed by at least one processor, cause the at least one processor to perform operations comprising:
receiving, from a first device of a first user, content adapted for display by a software application installed on the first device, the content addressed to a second user;

determining that the second user does not have an account associated with the software application; and in response to determining that the second user does not have an account associated with the software application:

identifying a supported electronic communication format, generating an electronic communication in the supported electronic communication format to enable the second user to receive the content, causing transmission of the electronic communication to a second device of the second user, and causing presentation of a notification at the first device, the notification indicating that the second user does not have an account associated with the software application.

19. The non-transitory computer-readable storage medium of claim 18, wherein determining that the second user does not have an account associated with the software application comprises attempting to identify the second user within a registry of users of the software application.

20. The non-transitory computer-readable storage medium of claim 18, wherein the notification further indicates the supported electronic communication format.

* * * * *